United States Patent [19]
Hetchler

[11] Patent Number: 5,338,136
[45] Date of Patent: Aug. 16, 1994

[54] CARGO RESTRAINT APPARATUS

[76] Inventor: Robert L. Hetchler, 291 County Rd. 99, Moulton, Ala. 35650-5285

[21] Appl. No.: 85,094

[22] Filed: Jul. 2, 1993

[51] Int. Cl.⁵ .................................... B60P 7/06
[52] U.S. Cl. .................. 410/100; 24/68 CD; 410/106; 410/103
[58] Field of Search ............ 410/12, 96, 97, 98, 410/99, 100, 102, 106, 110; 24/68 CD, 68 CT, 68 R, 70 ST, 69 ST, 70 TT, 69 TT, 69 CT, 69 T, 71 ST, 71 TD

[56] References Cited

U.S. PATENT DOCUMENTS

| | | | |
|---|---|---|---|
| 2,628,397 | 2/1953 | Olson | 410/106 X |
| 2,808,290 | 10/1957 | Nelson | 410/97 X |
| 3,428,331 | 2/1969 | Morgan et al. | 410/100 |
| 4,121,849 | 10/1978 | Christopher | 280/179 R |
| 4,369,009 | 1/1983 | Fulford | 410/12 X |
| 4,954,030 | 9/1990 | Szucs et al. | 410/100 X |
| 4,964,771 | 10/1990 | Callihan | 410/118 |

Primary Examiner—Michael S. Huppert
Assistant Examiner—James Eller
Attorney, Agent, or Firm—John C. Garvin, Jr.

[57] ABSTRACT

An apparatus for restraining articles in the bed of a truck such as a pick-up truck. The apparatus of the present invention includes a rigid support member secured at its upper end to one side wall of the bed of a truck, a pulley assembly secured to the lower end of the support member and to the floor of the bed of the truck adjacent the one side wall, a strap anchoring assembly secured to the floor of the truck adjacent the other of the side walls of the truck bed, a winch secured to the upper end of the rigid support member, and a flexible strap having a first end secured to the winch, a second end secured to the strap anchoring assembly, and an intermediate portion for engaging the articles loaded within the trunk bed to restrain them against the floor of the truck bed.

8 Claims, 1 Drawing Sheet

CARGO RESTRAINT APPARATUS

BACKGROUND OF THE INVENTION

1. Field Of The Invention

The present invention relates generally to an apparatus for restraining cargo on trucks and similar transporting vehicles and more particularly to an apparatus for restraining cargo in the bed of a truck such as a pick-up truck.

2. Description Of Related Art

Heretofore, substantial difficulties have been encountered in stabilizing articles such as ladders, lumber and other building materials carried in the open bed of pick-up trucks due to the fact that the articles are often longer than the bed of the truck, thus the articles extend outside of the bed of the truck and can easily fall from same. In the past, a number of U.S. patents have been granted on apparatuses for use with pick-up trucks to stabilize cargo carried in a pick-up truck and these include: U.S. Pat. Nos. 4,121,849 (Christopher); 4,507,033 (Boyd); 4,343,578 (Barnes); 4,964,771 (Callihan); 4,955,771 (Bott); 4,770,579 (Aksamit); 4,869,628 (Fletcher); and 4,842,458 (Carpenter).

The patent to Christopher is typical of the prior art devices and which discloses a cargo restraint apparatus somewhat like the present invention. The Christopher patent discloses a cargo restraint apparatus for mounting on top of the side walls of the bed of a pick-up truck adjacent to the front wall of the bed. Christopher's cargo restraint apparatus includes an elongated, hollow, support member secured at its ends to the tops of the side walls of the bed of the pick-up truck; an elongated rod provided with left handed threads over one-half of its length and right hand threads over the other half of its length; a crank secured to one end of the threaded rod; two threaded actuators mated with and mounted upon the threads of the elongated rod; two link-like member pivoted to and secured to a respective one of the threaded actuators; and a load engaging element pivoted to and secured to a respective one of the link-like members. The load engaging element of Christopher is moved toward and away from the load by rotation of the crank and the elongated rod moves the actuators to cause movement of the link-like members and load engaging element. The cargo restraint apparatus of Christopher as well as all of the other known prior art cargo restraint apparatuses might be suitable for their intended purposes, but they are generally more complex than the apparatus of the present invention and have other drawbacks and disadvantages. For example, the apparatus of Christopher has a relatively large number of moving parts which can be easily damaged; is substantially exposed above the top of each side wall of the bed of the truck and has a crank which extends beyond the side of the truck which could be easily damaged; and is very complex, particularly when compared to the apparatus of the present invention.

The present invention overcomes the disadvantages and drawbacks of the prior art apparatuses as well as provides several distinct advantages thereover in that it provides an extremely simple apparatus which is mounted below the top of the side walls of the bed of the pick-up truck and incorporates a support member which aids in preventing the separation of anchoring means from the floor of the bed of the truck.

SUMMARY OF THE INVENTION

According to the present invention, there is provided a simple and inexpensive apparatus for restraining or holding cargo such as lumber or ladders of relatively long lengths within the bed of a vehicle such as a pick-up truck. The cargo restraint apparatus of the present invention includes a rigid support member secured at its upper end to one side wall of the bed of the truck, a pulley assembly secured to the lower end of the support member, the pulley assembly being secured to the floor of the bed of the truck adjacent the one side wall of the truck bed, a strap anchor assembly mounted to the bed of the truck adjacent the other side wall of the truck bed, a winch secured to the upper end of the rigid support member, and a strap having a first end secured to the winch, a second end secured to the strap anchoring assembly and an intermediate portion for engaging the cargo loaded within the truck to restrain it to the floor of the bed of the truck. The simple cargo restraint apparatus of the present invention overcomes the numerous disadvantages and drawbacks of known prior art devices.

Accordingly, an object of the present invention is to provide a restraint apparatus primarily adapted to hold down cargo such as long pieces of lumber or ladders within the bed of a truck in an effective, efficient and economical manner.

A further object of the present invention is to provide a cargo restraint apparatus made from readily available, inexpensive, materials capable of being quickly assembled by relatively inexperienced persons without the need for special tools or mechanical skills.

A still further object of the present invention is to provide a restraint apparatus for holding down within the bed of a truck cargo, such as lumber or ladders, which extend outside the bed of the truck, and which is easy to install and permits ready and quick placement of cargo within the bed of the truck and removal therefrom.

These objects as well as other objects of the present invention will become more readily apparent after reading the following description in conjunction with the accompanying drawings and claims.

DETAILED DESCRIPTION OF INVENTION

Figure 1:
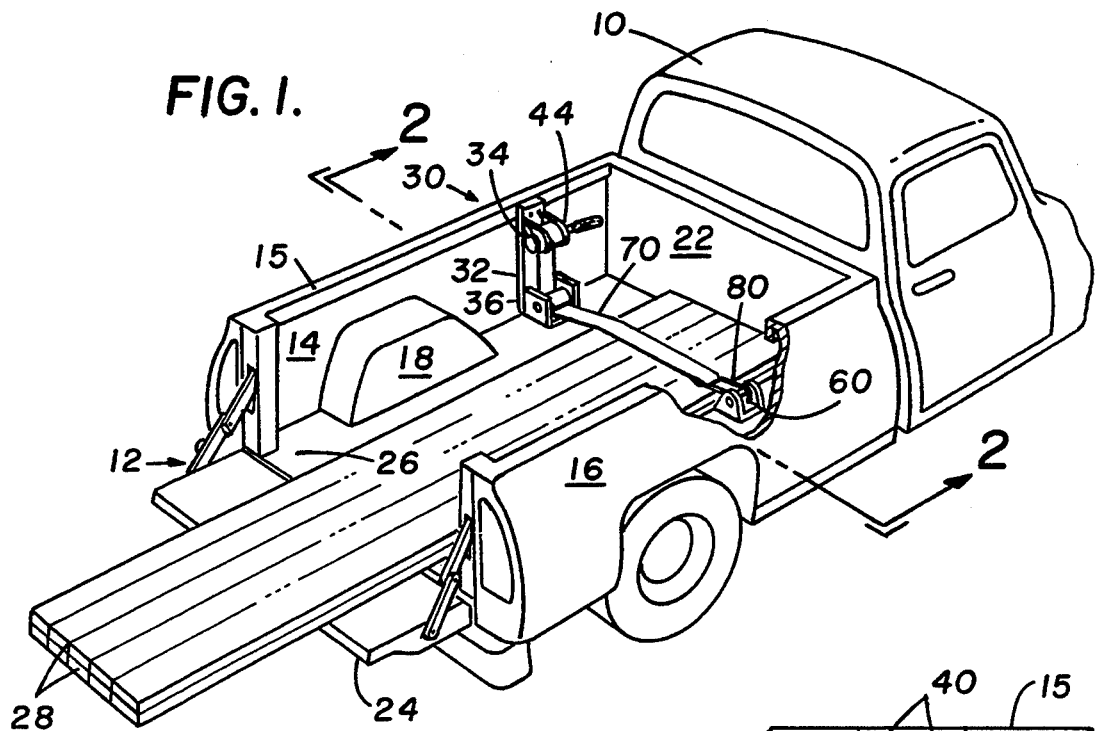
FIG. 1 is a partially broken away, perspective, view of the cargo restraining apparatus of the present invention mounted in the bed of a pick-up truck for stabilizing a load consisting of a plurality of pieces of lumber.
Figure 3:
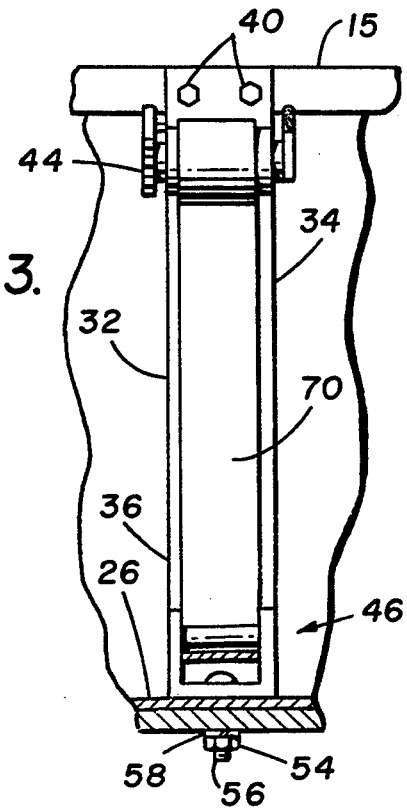
FIG. 3 is a sectional view of a portion of the cargo restraining apparatus of the present invention taken generally along line 3—3 of FIG. 2.
Figure 2:
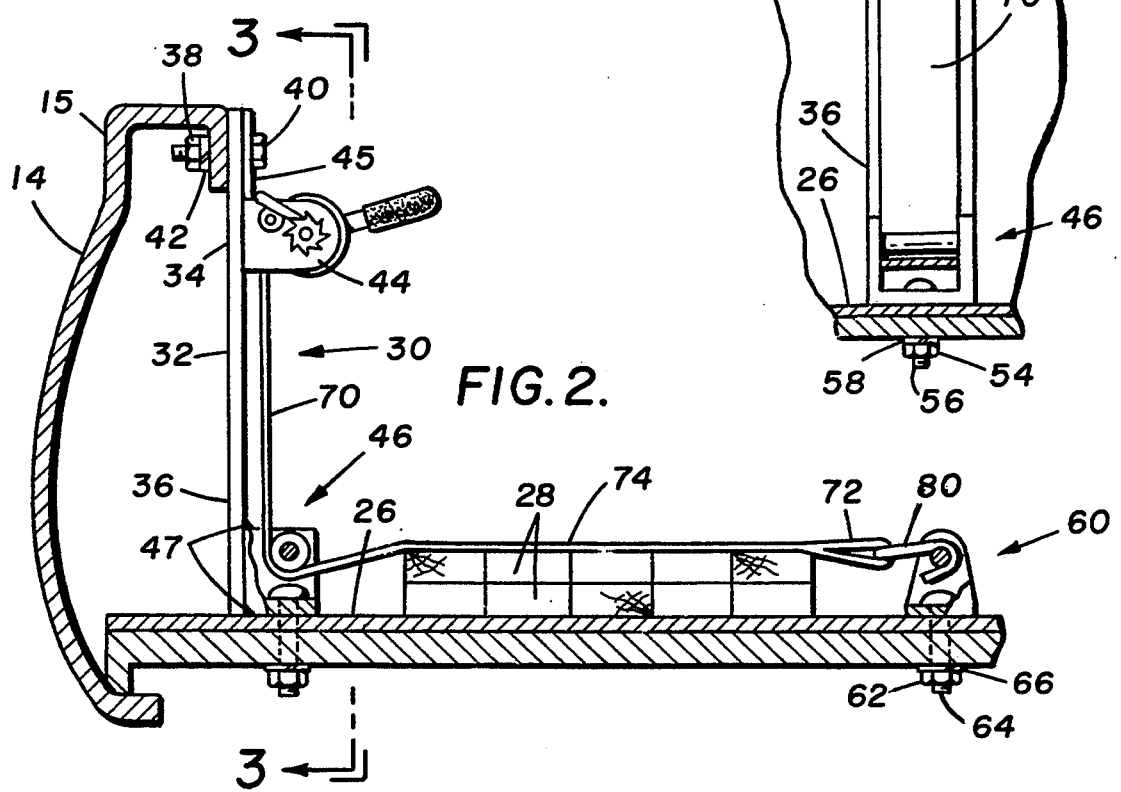
FIG. 2 is a cross sectional view taken along line 2—2 of FIG. 1 showing the cargo restraining apparatus of the present invention engaging a load consisting of a plurality of boards of lumber.

Referring now to FIG. 1 of the drawings, reference numeral 10 generally designates a conventional pick-up truck. Truck 10 comprises a cargo bed 12 having first and second parallel side walls 14 and 16 respectively, tire wells 18 (only one is shown), a forward wall 22, a tailgate 24, and a floor 26. The load, a plurality of elongated boards of lumber, carried by truck 10 is designated by reference numeral 28. The cargo restraining apparatus of the present invention, as best shown in FIGS. 1 and 2, is generally designated by reference numeral 30.

Cargo restraining apparatus 30 comprises a rigid support member 32 made of a suitable material such as metal and having an upper end 34 and a lower end 36, with the upper end 34 of support member 32 being secured to upper portion 15 of side wall 14 by any conventional means such as a nut 38, bolt 40 and lock washer 42 (FIG. 2), a conventional winch 44 with pawl and ratchet secured to upper end 34 of support member 32 by the nut 38, bolt 40 which pass through openings (not shown) in plate 45 (FIG. 2) of winch 44, and lock washer 42 or other suitable means such as welds, a pulley assembly 46 secured to lower end 36 of support member 32 by any conventional means such as welds 47, a nut 54, bolt 56 and lock washer 58 for securing pulley assembly 46 to the floor 26 of cargo bed 12, a strap anchor assembly 60 secured to the floor 26 of cargo bed 12 by any conventional means such as a nut 62, bolt 64 and lock washer 66, and a flexible strap 70 having a first end 72 secured to strap anchor assembly 60 by any conventional means such as a hook 80, a second end (not shown) secured to the drum (not shown) of winch 44 and an intermediate portion 74 which passes through pulley assembly 46 and also engages the load (boards 28) on its upper edge to force the load (boards 28) against the floor 26 of the cargo bed 12 to restrain the load (boards 28) within truck bed 12. The rigid support member 32 not only serves as a support for mounting the winch 44 and pulley assembly 46, but also serves as a spacer between the winch 44 and pulley assembly 46 to prevent a heavy load from exerting undue pressure upon the pulley assembly 46 and possibly causing it to separate from truck floor 26.

From the foregoing description, the operation of my improved cargo restrain apparatus will be readily understood. The several parts (rigid support member 32, the winch 44 with strap 70, the pulley assembly 46 and strap anchor assembly 46) of the restraint apparatus 10 is mounted in the cargo bed 12 as shown in the drawing. The strap 70 is loosen on the winch 44. Cargo such as boards of lumber 28 is then positioned within the cargo bed 12 as best shown in FIG. 1 and the strap 70 is tighten against the lumber 28 by rotation of the handle of winch 44. Once strap 70 is tighten, the conventional pawl and ratchet of winch 44 keep the strap 70 taut against the lumber 28 to retain the lumber 28 firmly in place and prevent lumber 28 from rising upwardly and becoming dislodged from cargo bed 28.

From the foregoing, it will also be seen that I have provided a simple, inexpensive, and improved apparatus for retaining articles in the bed of a truck, which apparatus may be employed, at the discretion of the operator of the truck, only when it is desired to hold down a load positioned within the bed of the truck.

While the above described constitutes the preferred embodiment of the present invention, it will be appreciated that the invention is susceptible to modification, variation and change without departing from the proper scope and fair meaning of the accompanying claims.

I claim:

1. A cargo restraint apparatus for a pick-up truck having a cargo bed including a pair of parallel side walls, each having an upper portion and a lower portion, a floor, and a forward wall, said cargo restraint apparatus comprising:

a rigid support member having an upper end and a lower end;

a winch mounted to said upper end of said rigid support member;

means for securing said upper end of said rigid support member to said upper portion of one of said side walls;

a pulley assembly mounted to said lower end of said rigid support member;

means for securing said pulley assembly to said floor of said cargo bed adjacent said one of said side walls;

a strap anchor assembly;

means for securing said strap anchor assembly adjacent the lower portion of the other of said side walls of said cargo bed; and a strap having a first end secured to said winch, an intermediate portion in engagement with said pulley assembly and cargo being carried in said cargo bed, and a second end secured to said strap anchor assembly.

2. The cargo restraint apparatus of claim 1 wherein said rigid support member serves as a spacer between said winch and said pulley assembly to relieve pressure from said pulley assembly and prevent said pulley assembly from being disengaged from said floor of said cargo bed.

3. The cargo restraint apparatus of claim 2 wherein said means for securing said upper end of said rigid support member to said upper portion of said one side wall comprises at least one threaded bolt, one threaded nut and one lock washer.

4. The cargo restraint apparatus of claim 3 wherein said means for securing said strap anchor assembly to said cargo bed comprises at least one threaded bolt, one threaded nut, and one lock washer.

5. A cargo restraint apparatus for a pick-up truck having a cargo bed including first and second parallel side walls, a forward wall, a floor, and a tailgate, the first and second side walls having lower and upper portions, said cargo restraint apparatus comprising:

a rigid metal support member having an upper end and a lower end;

a winch mounted to said upper end of said rigid support member and including a pawl and ratchet;

means for securing said upper end of said rigid metal support member and said winch to said upper portion of said first side wall;

a pulley assembly secured to said lower end of said rigid support member;

means for securing said pulley assembly to said floor of said cargo bed adjacent said lower portion of said first side wall;

a strap anchor assembly; means for securing said strap anchor assembly to said floor of said cargo bed adjacent said lower portion of said second side wall; and a strap having a first end secured to said winch, a second end secured to said strap anchor assembly, and an intermediate portion passing through said pulley assembly and extending transversely of said bed and over and in engagement with at least one article carried in said cargo bed for holding said at least one article in said bed.

6. The cargo restraint apparatus of claim 5 wherein said rigid support member serves as a spacer between said winch and said pulley assembly to relieve pressure from said pulley assembly and prevent said pulley assembly from being disengaged from said floor of said cargo bed.

7. The cargo restraint apparatus of claim 6 wherein said means for securing said upper end of said rigid support member to said upper portion of said one side wall comprises at least one threaded bolt, one threaded nut and one lock washer.

8. A cargo restraint apparatus of claim 7 wherein said means for securing said strap anchor assembly to said cargo bed comprises at least one threaded bolt, one threaded nut, and one lock washer.

* * * * *